Figure 1:
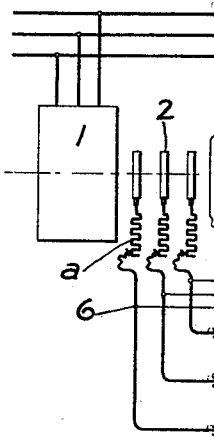

April 9, 1929.　　　　　W. SEIZ　　　　　1,708,850

REGULATION OF INDUCTION MOTOR CASCADES

Filed Aug. 11, 1927

Inventor:
Walter Seiz,
by
His Attorney.

Patented Apr. 9, 1929.

1,708,850

UNITED STATES PATENT OFFICE.

WALTER SEIZ, OF BADEN, SWITZERLAND, ASSIGNOR TO GENERAL ELECTRIC COMPANY, A CORPORATION OF NEW YORK.

REGULATION OF INDUCTION-MOTOR CASCADES.

Application filed August 11, 1927, Serial No. 212,225, and in Germany August 19, 1926.

My invention relates to induction motor cascade regulating systems in which a shunt regulating machine excited from the cascade circuit is employed in connection with additional adjustable resistance in the cascade circuit to increase the regulating range.

In the closed cascade connection of induction motors and commutator shunt machines it may be sufficient to have a certain range of regulation during normal operating conditions, but in exceptional cases it is desirable to increase this regulating range considerably. As the cost of the regulator unit increases rapidly with an increasing range, it is often uneconomical to design the shunt machine for a regulating range which appears only in exceptional cases. It has been suggested to design the regulating machine only for normal variations and to increase the slip in exceptional cases by means for connecting additional resistance in the rotor circuit. Such an arrangement is described in my United States Patent No. 1,597,485. This resistance is active only under load conditions, as is the case for an induction motor operating as a single unit. When the excitation of the commutator machine is connected in series with its armature and with the rotor of the main motor, it is evidently unimportant where the additional resistance is connected in the rotor circuit. On the other hand, conditions are different if the commutator machine is excited through a shunt winding, regardless of whether the adjustments of the excitation is obtained by means of an exciting transformer, an exciter or through a series resistance. For this case the additional resistance will cause an essential change in speed of the motor while loaded if such additional resistance is connected in the cascade circuit between the commutator machine and the connecting point of the shunt exciting circuit. If the additional resistance is, therefore, to be used for speed regulation in the usual way, it is necessary to have it connected as just explained above. According to the invention under consideration, the insertion of the additional resistance is to have no immediate effect on the speed of the induction motor, regardless of whether load or no load conditions are present. Furthermore, only when the machine is loaded will the insertion of the additional resistance decrease the voltage of the commutator machine with respect to the value obtained when this resistance is short-circuited. According to the present invention, by inserting the additional resistance, the slip of the main motor may be considerably increased by increasing the excitation of the commutator machine even if the voltage of the commutator machine had reached its maximum value before the resistance was inserted in the circuit. Compared to the usual method by which the slip is increased immediately when the resistance is inserted, this arrangement has an essential advantage. If a resistance of the optional value is inserted in this circuit, no surge will occur in the input of the main motor because, as will be hereinafter explained, the speed is then practically the same at any load as it was before the resistance was inserted.

In order to prevent any effect on the speed while inserting the additional resistance, the arrangement according to the invention is such that this resistance is inserted in the rotor circuit between the induction motor and the connecting point of the shunt exciting circuit instead of between this point and the commutator exciting machine terminals.

Figure 3:
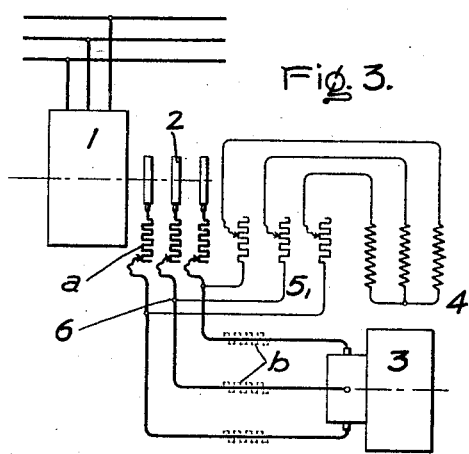
Figure 2:
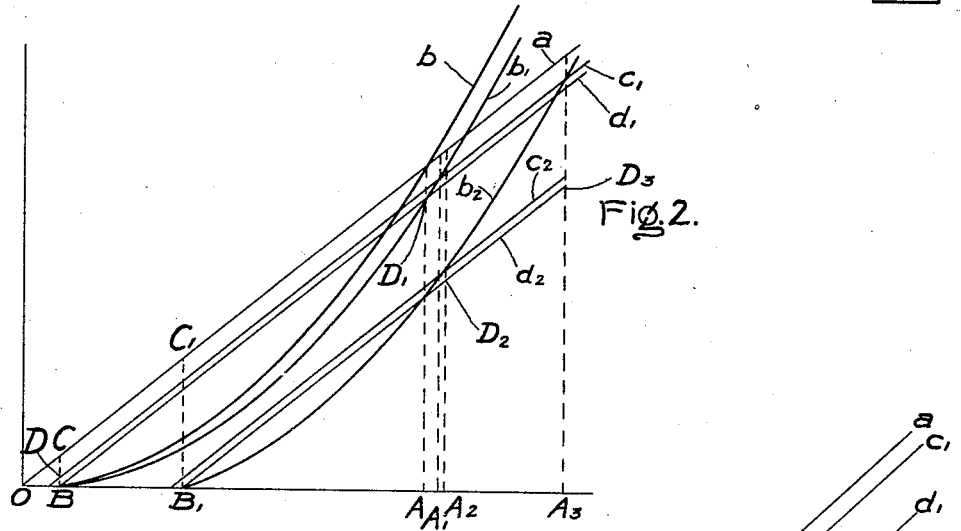
Figure 4:
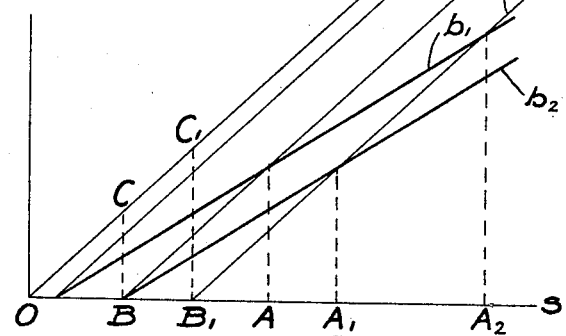

The features of my invention which are believed to be novel and patentable will be pointed out in the claims appended hereto. For a better understanding of my invention reference is made in the following description to the accompanying drawing in which Fig. 1 illustrates a connection including an additional resistance in the rotor circuit for effecting speed regulation of a motor; Fig. 2 is a slip voltage diagram referring to the connections of Fig. 1; Fig. 3 is similar to Fig. 1 except that an adjustable resistance 5 is used in the exciter circuit instead of an adjustable transformer. Fig. 4 is a slip-voltage diagram corresponding to the arrangement of Fig. 3.

Referring to the connections shown in Fig. 1, 1 is the main motor, 2 the slip rings of the same, 3 the commutator machine, 4 the exciting winding of the same, 5 the adjustable exciting transformer and 6, the connecting point of the exciting circuit with the rotor circuit. Instead of the exciting transformer 5 an exciter may be used.

The ordinates from the line $a$, Fig. 2, represents the slip-voltage of the rotor of the main motor 1 as a function of the slip $s$. When running light and no phase compensation is provided for, the commutator machine must induce the same voltage but of opposite polarity, independent of the value of the resistance in the rotor circuit. In order to obtain a magnetic flux in the commutator machine of corresponding value, it is necessary to obtain a voltage at the terminals 6, Fig. 1, which is a function of the slip and determined by the parabola $b$, Fig. 2. The parabola $b$ applies only for a certain adjustment of the exciting transformer 5. The ohmic resistance of the exciting circuit is negligible as compared to its inductive resistance.

The main motor operates as well at no load as at any load and always with a slip determined by the voltage at the terminals 6 which is the same as the exciting voltage required by the magnetic flux of the commutator machine. At no load this slip is equal to $OA$. At full load and without any additional resistance in the rotor circuit, let the voltage drop for the whole rotor circuit be $BC$. The resistance of the commutator machine is assumed to be one-half of the resistance of the rotor of the main motor. $BD$ is then the voltage drop in the commutator machine and $DC$ the drop in the rotor of the main motor. The voltage at the point 6, which is now the same as the slip ring voltage of the main motor, can have only one given value at full load, which depends upon the slip and is represented by the ordinates from the line $c_1$. In the same way the voltage induced in the commutator machine is represented by the line $d_1$. As the voltage of the commutator machine is lower than when running light, the exciting voltage which is a function of the magnetic flux will also become smaller and is represented by the curve $b_1$. The slip of the motor at full load corresponds to the crossing point of the line $c_1$ and the curve $b_1$ and is equal to $OA_1$.

If an additional resistance is connected in the rotor circuit, for example, the five-fold resistance of the rotor of the main motor, the voltage drop of the full load current in the rotor circuit will become $B_1C_1$. The voltage induced in the commutator machine at full load will reach a value represented by the line $d_2$ and the exciting value is given by the curve $b_2$. The voltage at the connecting point of the excitation 6, Fig. 1, depends upon where the additional resistance is connected. If it is connected at $a$, Fig. 1, that is, between the slip rings of the main motor and the point 6, the voltage is represented by the line $C_2$, Fig. 2. If connected at $b$, that is, between the point 6 and the commutator machine, the voltage at 6 is represented by the line $c_1$. In the former case the slip of the main motor at full load and with additional resistance connected is given by the crossing point between $b_2$ and $c_2$, that is $OA_2$; in the latter case it is represented by the crossing point between $b_2$ and $c_1$, that is $OA_3$. If, therefore, the additional resistance is inserted at $a$, Fig. 1, the secondary current and the slip will remain practically the same as it was before, regardless of the load and no appreciable shock will result when it is inserted. If connected at $b$, Fig. 1, the slip is considerably increased. This increase is about the same as the value $BB_1$, which is the value to which the slip of an asynchronous motor would rise for the same resistance in case of no excitation of the commutator machine. If the resistance is connected at $a$, Fig. 1, the voltage of the commutator machine will be decreased from $AD_1$ to $A_2D_2$; if the resistance is connected at $b$, Fig. 1, the voltage will increase to $A_3D_3$. If the resistance is connected at $b$ a surge will occur the magnitude of which will increase with increasing resistance. When the resistance is connected at $a$, Fig. 1, a wider range of regulation is possible due to the fact that the voltage of the commutator machine may be decreased. In this case, however, the regulation must be obtained by adjusting the exciting transformer. By connecting a resistance of suitable value in series with the transformer, the steps may be varied as desired.

To summarize, the invention under consideration involves a method of regulation and a cascade connection of an induction motor and a commutator shunt machine having additional resistance in the rotor circuit connected between the slip rings of the main motor and the point 6 of the shunt exciting circuit for the purpose of regulating the voltage of the commutator machine by means of this resistance without affecting the speed, said speed being adjusted merely by regulating the excitation of the commutator machine.

A voltage diagram is shown in Fig. 4 corresponding to the commutator machine of Fig. 3 which is excited from the armature circuit through resistances $5_1$.

Referring to Fig. 3, 1 is the main motor, 2 the slip rings of the same, 3 the commutator machine, 4 the exciting winding of the same, $5_1$ the regulator unit and 6 the point where the exciting winding is tied to the armature circuit. It is preferable if the steps of the regulator unit are of a value several times higher than that of the inductive resistance of the exciting winding 4.

As before, the line $a$, Fig. 4, represents the voltage of the slip $s$ of the main motor as a function of the slip of the same motor. The speed, when running light, is, with reference to this connection, always the asynchronous speed substantially independent of the value of the regulator unit. If, as before, $BC$ represents the total voltage drop of the full load current in the rotor without any additional resistance, the voltage of the excitation at the point 6 at full load is a function of the slip and is represented by the line $c_1$, Fig. 4. The voltage to be induced in the commutator machine is represented by the line $d_1$. The effective resistance of the commutator machine which, according to this connection, may be increased to a suitable value, is assumed to be the four-fold value of the resistance of the rotor of the main motor. The voltage induced in the commutator machine is proportional to the exciting voltage and is represented by the line $b_1$. The slip at full load has the value OA at which point the lines $b_1$ and $d_1$ cross each other.

If the voltage drop of the full load current in the rotor is increased to the value $B_1C_1$ by means of an additional resistance which may be equal to the resistance of the commutator machine, the voltage to be induced in the commutator machine is represented by the line $d_2$. The voltage at the terminals 6, if the resistance is inserted at $a$, Fig. 3, is represented by the line $d_1$, and if the resistance is inserted at $b$, Fig. 3, by the line $c_1$. The voltage induced in the commutator machine due to the exciting voltage is in the former case represented by the line $b_2$ and in the latter case, or in the case of short-circuited resistance, by the line $b_1$. The slip at full load is, in the former case, represented by the crossing point between the lines $b_2$ and $d_2$ and is equal to $OA_1$, and in the latter case is represented by the crossing point $b_1$ and $d_2$, that is, equal to $OA_2$.

Even if the regulation of the resistance is carried out in the exciting circuit the additional resistance in the rotor circuit at $a$, Fig. 3, keeps down the voltage of the commutator machine. However, it has much less effect on the slip than if it were connected in at $b$, Fig. 3.

An important special case of technical interest occurs, with reference to the connection under consideration, when the exciting resistance is so adjusted that the voltage induced in the commutator machine is equal but opposite to the exciting voltage. Then, if a constant voltage, which is independent of all effects in the rotor circuit, is impressed on the rotor circuit, it will produce a constant effect of the rotating field of the main motor. In this case, the effect of the rotating field at the asynchronous motor is not changed by connecting an additional resistance in the rotor at $a$, Fig. 3. Only the voltage of the commutator machine for a given slip is changed. Therefore, the resistance may be connected without any shock whatever. It is possible to keep the load constant even at such a slip where, due to saturation of the commutator machine, the effect of the rotating field does not stay constant. In all connections described above the regulation of the resistance at $a$, Figs. 1 and 3, may be obtained whether by hand or automatically, for example, regulated by speed, current, load or by the position of the regulating device.

It may be noted that the conditions described herein are those present when the armature of the commutator regulating machine is connected in closed cascade with the secondary of the induction machine. These conditions do not exist in that type of system in which the regulating machine is connected in series with a separate source of supply and serves as a frequency converter.

In accordance with the provision of the patent statutes I have described the principle of operation of my invention together with the apparatus which I now consider to represent the best embodiment thereof but I would have it understood that the apparatus shown is only illustrative and that the invention may be carried out by other means.

What I claim as new and desire to secure by Letters Patent of the United States, is:

1. A cascade regulating system comprising an induction machine, a regulating machine connected in closed cascade therewith, a shunt field winding for said regulating machine energized from the cascade circuit, and means for varying the resistance of the cascade circuit between the induction machine and the point from which the shunt field winding is energized for varying the voltage of the regulating machine without substantially varying the speed of said motor.

2. A cascade regulating system comprising an induction machine, a regulating machine connected in closed cascade therewith, a field winding for said regulating machine, means for energizing said winding in proportion to the voltage at a given point of the cascade circuit, means for regulating the resistance of said cascade circuit between said point and the induction machine to vary the voltage of the regulating machine without appreciable variation in the speed of said motor, and means for varying the speed of said motor by regulation of the field excitation of said regulating machine.

3. In a cascade regulating system comprising an induction motor and a regulating machine connected in closed cascade with said motor, the method of altering the regulating range of the regulating machine without any appreciable change in motor speed while under load, which consists in exciting said regulating machine from the voltage of said cascade circuit and varying said exciting voltage by varying the resistance drop in the cascade circuit in such manner that the resulting variation in the voltage of the regulating machine is such as to offset the change in resistance drop in the cascade circuit and maintain the secondary current of the induction machine substantially constant.

In witness whereof, I have hereunto set my hand this 26th day of July, 1927.

WALTER SEIZ.